United States Patent [19]
Bastgen

[11] Patent Number: 4,879,034
[45] Date of Patent: Nov. 7, 1989

[54] DEWATERING DEVICE WITH TWO FILTERING BELTS

[75] Inventor: Wendel Bastgen, Betzdorf/Sieg, Fed. Rep. of Germany

[73] Assignee: Alb. Klein GmbH & Co. KG, Niederfischback, Fed. Rep. of Germany

[21] Appl. No.: 250,045

[22] Filed: Sep. 27, 1988

Related U.S. Application Data

[63] Continuation-in-part of Ser. No. 714,630, Mar. 21, 1985, abandoned.

[30] Foreign Application Priority Data

Mar. 23, 1984 [DE] Fed. Rep. of Germany ....... 3410745

[51] Int. Cl.$^4$ .......................... B01D 33/04; B01B 5/06
[52] U.S. Cl. .................. 210/400; 210/DIG. 3; 100/118; 100/153; 100/154; 100/211; 198/628
[58] Field of Search ............... 210/350, 351, 386, 400, 210/401, DIG. 3; 100/118, 119, 120, 151, 153, 154, 211; 162/273, 348, 350, 354, 300, 301, 358, 361; 198/627, 628

[56] References Cited

U.S. PATENT DOCUMENTS 3,587,451 6/1971 Luthi .................................. 210/386
3,876,499 4/1975 Vesanto ............................... 162/301
3,971,310 7/1976 Kondos et al. ...................... 100/152
4,647,417 3/1987 Bottger et al. ...................... 100/154

FOREIGN PATENT DOCUMENTS

3145085A1 5/1983 Fed. Rep. of Germany .

Primary Examiner—W. Gary Jones
Assistant Examiner—Matthew Savage
Attorney, Agent, or Firm—Bachman & LaPointe

[57] ABSTRACT

A dewatering device with two filtering belts comprising two endless bands guided over drums and a gap limited by the bands for a heap of debris as pressure product guided through this pressure zone, with a supporting means being allocated to one of the bands on that side looking away from the heap of debris is to be improved concerning its dewatering activity. For this purpose, the supporting means is provided in the form of a supporting plate (20) curved in the driving direction (x), which supports a sieve-like belt or band (13) in the pressure zone and shows break-throughs. The band (13) rests on a gliding plane of the curved and perforated supporting plate (20), the radius of curvature (r) of which decreases towards the driving direction (x). The supporting plate (20) is composed of a flexible material so that its radius of curvature (r) can be adjusted.

11 Claims, 2 Drawing Sheets

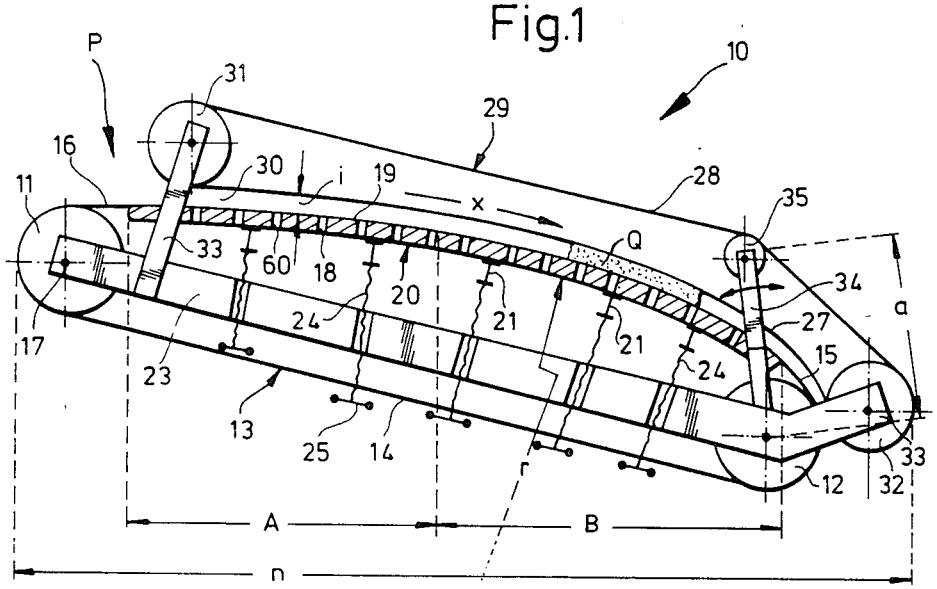
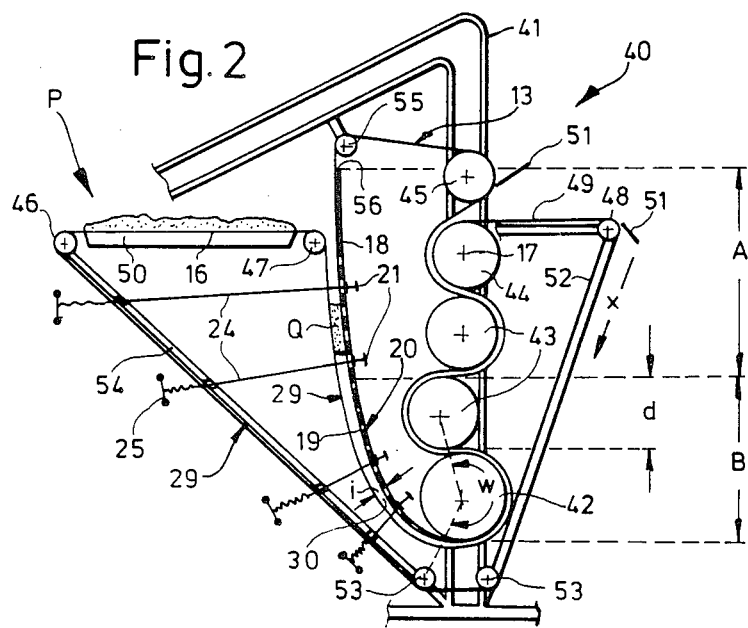

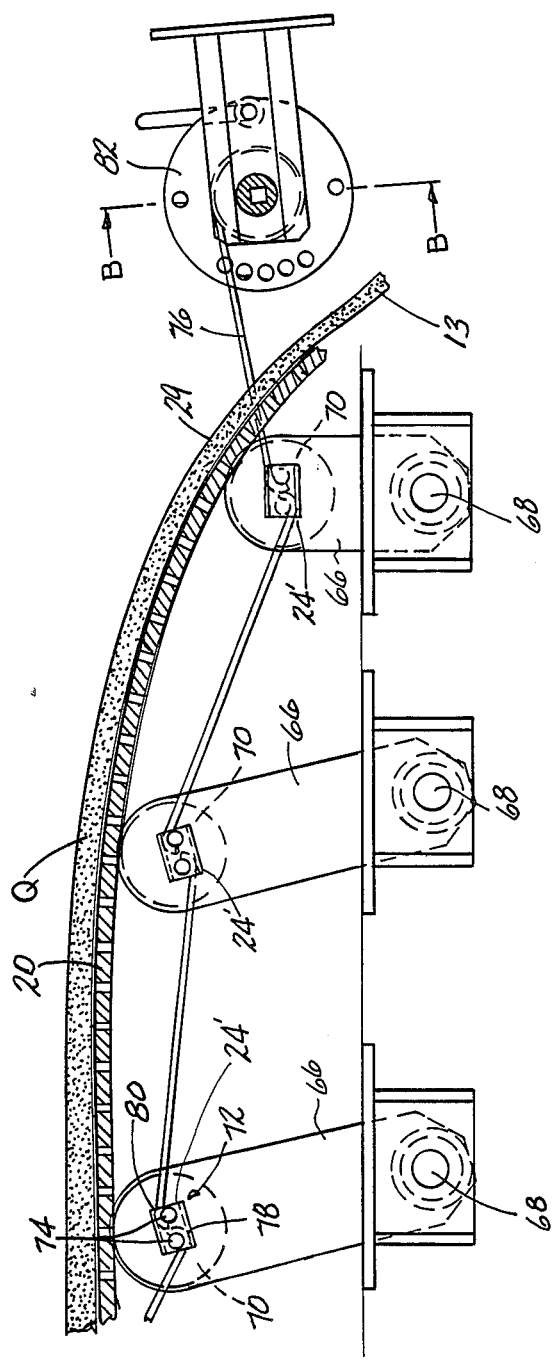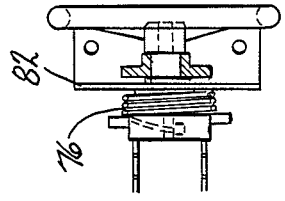
FIG-4
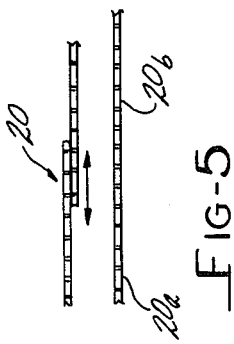
FIG-3
FIG-5

DEWATERING DEVICE WITH TWO FILTERING BELTS

CROSS-REFERENCE TO RELATED APPLICATION

This is a continuation-in-part of Ser. No. 714,630 to Wendel Bastgen, filed Mar. 21, 1985, now abandoned.

BACKGROUND OF THE INVENTION

This invention relates to a dewatering device with two filtering belts comprising two rotating bands guided over drums and a gap limited by the bands for a heap of debris as pressure product guided through this pressure zone, with a supporting means being allocated to one of the bands on that side looking away from the heap of debris.

Dewatering devices with two filtering belts of this kind used for continuous processing of pressure mass into plate-like workpieces are, for instance, known from DE-OS 31 45 085, with belts rotating on pressure rams being allocated to the pressure zone as supporting means.

DESCRIPTION OF THE PREFERRED EMBODIMENTS

It is an object of the invention to improve the dewatering of press masses in dewatering devices With two filtering bands of the type described.

This object will be obtained by providing a supporting means in the form of a supporting plate curved in the driving direction, which supports a sieve-like or screening belt in the pressure zone, shows breakthroughs and has a radius of curvature decreasing towards the driving direction.

Under these terms the path of the band over the gliding plane convexly curved results in an increase of pressure acting on the pressure product. According to the invention, this pressure is to meet the respective requirements in that the radius of curvature of the supporting plate can be varied according to the invention. For this purpose, the supporting plate itself is either composed of a flexible material or of several parts being arranged to one another variably concerning the direction; an especially favorable embodiment will be achieved by using a perforated link conveyor with links being adjustable in the curvature desired.

Compared to supporting rolls, which are known in the prior art, this supporting plate shows the advantage that no sections of reduced pressure, which are inevitable between rolls, will develop, in which part of the liquid pressed out just before will be sucked back into the pressure product, because this pulsating increase of pressure may result, under certain circumstances, in intrinsically viscous changes of the pressure product, especially in the case of a sludge-like pressure product which gets even more liquid due to these changes and favors flow-back and lateral crush out respectively.

If wedge-shaped pressure plates were arranged on both sides of the pressure zone, the pressure power would increase constantly and there would be no zones of reduced pressure; however, a very high friction between the two bands and the gliding plane would develop and result in wear. Furthermore, certain difficulties also arise from the fact that there are relatively small open planes of pressure plates which accompany the pressure product on both sides and obstruct a discharge of the filtrate. Both systems described have the disadvantage in common that foreign matter produce uncontrollable peaks of pressure which may result in the destruction of the filter bands and possibly in the breakdown of the entire pressure zone. The dewatering device with two filtering bands of the present invention overcomes all these shortcomings.

According to another aspect of the invention, both bands are provided in the form of filters, i.e. are screening belts from metal or plastic mesh; a usual metal band can be replaced by a flexible band made of or with filaments of plastics. Filaments of plastics of this kind adapt in an especially favorable way to the curved gliding plane and are employed above all when the pressure zone is used for dewatering of sludge-like suspension.

The curvature of the supporting plate according to the invention is preferably changed by means of adjusting means which are attached to supports for the supporting plate. These supports are either provided below the supporting plate, that is to say in the curvature, and are lifted in order to reduce the radius of curvature, or, in the case of vertically arranged supporting plates, the supports are provided at the rear side of the plates and the adjusting means are guided to the other side of the plate; in this case these adjusting means are under tension, whereas, in the first case, they serve as pressure means.

It turned out to be particularly favorable if the vertically arranged pressure plate is followed by a roller zone in the driving direction, in which the bands are guided meander-like. This roller zone preferably extends parallel to the direction of the pressure plate and thus makes it possible to return the bands from the end of the supporting plate through the meander-like zone to the beginning of the supporting plate.

The latter embodiment, in particular, requires compact over-all dimensions and is highly efficient.

Concerning further aspects, reference is made to the following description and the claims.

BRIEF DESCRIPTION OF THE DRAWINGS

FIG. 1 is a schematic illustration of a dewatering device in accordance with the present invention;

FIG. 2 is a schematic illustration of another dewatering device embodiment;

FIG. 3 is a schematic illustration of the dewatering device of FIG. 1 and details of an adjusting device which can be used therein; and FIG. 4 is a view in partial cross-section of a winch taken along lines B—B in FIG. 3.

FIG. 5 illustrates the support plate of the device in FIG. 1 made of several parts.

Further features advantages and details of the invention will be apparent from the following description of the preferred embodiments and with reference to the accompanying drawings.

DETAILED DESCRIPTION OF THE DRAWINGS

Referring to FIG. 1, a dewatering device 10 has a perforated metal band 13 guided infinitely over two drums 11, 12, the lower run 14 of which forms a tangent plane between those drums 11, 12, and the upper run 15 of which is guided over a supporting plate 20 which is curved upwards.

The perforated supporting plate 20 is made of a limited flexible material and rests on cross-sections or supports 21, the position of which is, with regard to a supporting frame 23 of the dewatering device 10 holding the drums 11, 12, adjustable by means of adjusting means. By operating control device 25 of adjusting means 24, the curved form of supporting plate 20 can be changed and fixed in the form desired.

Zone A of supporting plate 20, which is at the back in the driving direction, is almost plane in the embodiment presented and passes into a curvature zone B, which is directed downwards towards drum 12, with a radius of curvature r decreasing towards the drum, the radius corresponding at this point to the length n of the dewatering device 10.

The lower run 27 of an upper metal band 29 runs above the upper run 15 of the lower metal band 13, thus forming a gap 30 of a gap width i decreasing in the driving direction x.

The idling side 27 of the upper metal band 29, which has an upper run 28, essentially adapts to the form of curvature of the supporting plate 20; the gap width i is determined by the thickness of a pressure produce layer Q fed with a pressure product; see arrow P.

The upper metal band 29 is guided over drums 31, 32 which are fixed to arms of the frame 33. A pair of links 34 carries a conveyor drum 35 for the pulling side 28 of the upper metal band 29, the tension of which can be adjusted due to the conveyor drum 35. The pair of links 34 is pivoted around shaft 17 of the lower drum 12 and can be varied in its length a.

In the embodiment of a dewatering device 40 according to FIG. 2 several drums 42, 43, 44, 45 are arranged one upon another on shafts 17 on a vertical frame profile 41, with the diameter d decreasing from bottom to top. Two perforated metal bands 13, 29 are guided meander-like between these rolls or drums 42-45 which form a roller zone.

The metal band 29 constitutes a horizontal delivery plane 16 for the pressure product p between two rolls 46, 47 over an interception trough 50, is deflected downwards over roll 47, reaches along a supporting plate 20 the lower base drum 42 and via this drum as well as two intermediate drums 43 drum 44 between the latter and a roll at the delivery 48 the metal band 29 runs about horizontally as a delivery plane 49. Passing a doctor 51 and an inclined frame part 52, the metal band 29 runs downwards to the base rolls 53 and from there, along an inclined frame 54, back to feeding roll 46, at which it passes to that horizontal interception plane 16.

The other metal band 13 is guided parallel to metal band 29 along surface 19 of the curved supporting plate 20 to base drum 42. This supporting plate 20 is approximately vertical in its upper part (zone A) and bends with its lower par (zone B) towards base drum 42, the circumference of which rests on the metal band 13 in the region of an envelopment angle w—covered by the other metal band 29 which passes over direct to the circumference of the next drum 43. In this alternate facility on the respective circumference Of the drum both metal bands 13, 29 reach the upper drum 44, above which they disengage from one another. The upper metal band 13 is guided over a ridge roll 45 to a deflection roll 55 which rests above the upper edge 56 of thereby forming a horizontal delivery surface supporting plate 20.

The adjusting means 24 are secured to the supports 21 and run almost horizontally from frame 54 to supports 21, in the case of a dewatering device with two filtering bands, the supports being arranged along the back 18 of supporting plate 20 and are drawn towards supporting plate 20 by the control devices 25 in order to increase the curvature, whereas in FIG. 1 the adjusting means 24 support the support 21 and press the latter against supporting plate 20 in order to increase the curvature.

As mentioned at the beginning, both dewatering devices with two filtering bands 10, 40 are represented only very schematically and the necessary pres frames indicated by 23, 33, 41, 52 and 54, which are known from roll trestles, are merely outlined. The interception devices necessary for the liquid penetrating through the perforated metal bands 13, 29 are, except for interception trough 50, neglected in the drawing.

Both dewatering devices with two filtering bands 10, 40 are provided with a pair of perforated or weaved metal bands 13, 29, between which the pressure product Q is delivered through the pressure zone determined by the supporting plate 20 and the gap 30, and is dewatered through the metal bands and the elastic supporting plate 20 perforated at 60. The latter is preferably made of special steel, but can also be, in an example not shown, a plastic plate. It cannot be gathered from the drawing that the surface 19 of supporting plate 20 is provided in the form of a gliding layer.

In special embodiments of the dewatering devices with two filtering bands 10, 40 the rotating bands 13, 29 are composed of a plastic fabric or a netband in which woof or warp are a filament of plastics.

One type of adjusting means 24' for varying the curvature of the support plate 20 is illustrated in FIGS. 3 and 4. The adjusting means 24' comprises a series of movable members 66, each pivotable about a pin 68. Each pin 68 may be joined to the supporting frame 23 in any desired manner. The end of each member 66 opposite the pin preferably comprises a tubular or cylindrical structure 70 in contact with the underside of the supporting plate 20.

Mounted to an end wall of each tubular structure 70 is a bracket 72 having a pair of spaced apart pin members 74 about which a control cable 76 such as a steel rope can be wrapped. As shown in FIG. 3, the control cable 76 preferably enters one side of the bracket, passes first between a first pin 74 and an edge 78 of the bracket, next between the two pins 74, then between the second pin 74 and a second edge 80, and finally exits the bracket at the opposite side.

As shown in FIG. 3, a single control cable 76 can be used to adjust the position of each member 66. The control cable is fixed at one end to a winch 82 and at the opposite end to either a second winch not shown or the last of the series of movable members. To adjust the position of the movable members, the winch 82 is operated to either wind or unwind the cable 76. This causes the members 76 to rotate about their respective pivot points, the fixed pins 68, which in turn causes the supporting plate's radius of curvature to change in a desired manner.

As shown in FIG. 5, the support plate 20 may be composed of several parts 20a, 20b. The parts may be joined together in any suitable manner known in the art so as to provide the support plate 20 with the desired flexibility and adjustability.

It is apparent that there has been provided in accordance with this invention a dewatering device with two filtering belts which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A dewatering device comprising a first endless band and a second endless band spaced from said first endless band and forming a pressure zone gap therebetween, each of said endless bands being movable around and between pairs of guide rollers in one driving direction, an adjustable perforated supporting plate formed from a flexible material for supporting one of said endless bands, said supporting plate having a pair of generally parallel surfaces and being adjustable over substantially its entire length, one of said surfaces defining a curved surface having a radius of curvature which decreases toward the driving direction whereby said one surface biases said one of said endless bands in the pressure zone.

2. A device according to claim 1 including adjusting means for moving said supporting plate so as to adjust the radius of curvature of said supporting plate.

3. A device according to claim 1 wherein said supporting plate comprises several parts.

4. A device according to claim 2 wherein said adjusting means for adjusting the radius of curvature is secured to the adjustable supporting plate.

5. A device according to claim 2 wherein said adjusting means is linked with supports which run along the other of said surfaces of the adjustable supporting plate.

6. A device according to claim 5 wherein said supports run transversely to the driving direction.

7. A device according to claim 5 wherein said supports and said adjusting means, are both provided on the other of said surfaces of said adjustable supporting plate, said adjusting means being linked with control devices.

8. A device according to claim 1 wherein said curved surface essentially runs vertically with the endless bands constituting basically horizontal delivery planes.

9. A device according to claim 1 wherein said curved surface is followed by a roller zone in the driving direction, at the end of said roller zone said endless bands diverge to constitute a delivery plane.

10. A device according to claim 9 wherein said curved surface and said roller zone run parallel to one another and said one of said endless bands is returned from of the roller zone to the beginning of the pressure zone.

11. A device according to claim 1 wherein said endless bands are filter bands.

* * * * *